(12) United States Patent
Poussin

(10) Patent No.: US 10,792,636 B2
(45) Date of Patent: Oct. 6, 2020

(54) COVER SYSTEM FOR A SOLID PARTICLE LINING AND REACTOR COMPRISING SUCH A SYSTEM

(71) Applicant: CREALYST-GROUP, Semur-en-Vallon (FR)

(72) Inventor: Bernard Poussin, Semur-en-Vallon (FR)

(73) Assignee: CREALYST-GROUP, Semur-en-Vallon (FR)

( * ) Notice: Subject to any disclaimer, the term of this patent is extended or adjusted under 35 U.S.C. 154(b) by 0 days.

(21) Appl. No.: 16/490,742

(22) PCT Filed: Feb. 16, 2018

(86) PCT No.: PCT/FR2018/050379
§ 371 (c)(1),
(2) Date: Sep. 3, 2019

(87) PCT Pub. No.: WO2018/158521
PCT Pub. Date: Sep. 7, 2018

(65) Prior Publication Data
US 2020/0023329 A1 Jan. 23, 2020

(30) Foreign Application Priority Data
Mar. 1, 2017 (FR) ..................... 17 51676

(51) Int. Cl.
*B01J 8/02* (2006.01)
(52) U.S. Cl.
CPC ........... *B01J 8/0292* (2013.01); *B01J 8/0214* (2013.01); *B01J 8/0278* (2013.01); *B01J 2208/00884* (2013.01); *B01J 2208/00938* (2013.01)

(58) Field of Classification Search
CPC .................. B01J 8/0214; B01J 8/0407–0419
See application file for complete search history.

(56) References Cited

U.S. PATENT DOCUMENTS 2,319,620 A * 5/1943 Mather .................. B01J 8/0214
208/74
2,634,194 A * 4/1953 Nebeck .................. B01J 8/0214
422/218

(Continued)

FOREIGN PATENT DOCUMENTS

FR 2663244 A1 12/1991
GB 1387044 A * 3/1975 ............ B01J 8/0005

OTHER PUBLICATIONS

International Search Report dated May 25, 2018 issued in PCT/FR2018/050379.

*Primary Examiner* — Jennifer A Leung
(74) *Attorney, Agent, or Firm* — Scully, Scott, Murphy & Presser, P.C.

(57) ABSTRACT

The invention relates to a cover system (5) for a solid particle lining (3) comprising an articulated structure (11) and an annular casing (13) covering the articulated structure (11), the casing (13) being formed by metal plates (16, 17) sealingly mounted so as to be movable relative to each other, the articulated structure (11) having metal skirts (31) forming articulated concentric circles (33) for supporting the plates (16, 17) of the casing (13) and adapting to the deformations of the lining (3), and metal elements (35) forming articulated spacers (37) making it possible to maintain a spacing between the articulated concentric circles (33) and to adapt to the deformations of the lining (3).

13 Claims, 4 Drawing Sheets

(56) References Cited

U.S. PATENT DOCUMENTS

| | | | | |
|---|---|---|---|---|
| 4,374,094 A | * | 2/1983 | Farnham | B01J 8/008 208/146 |
| 5,202,097 A | * | 4/1993 | Poussin | B01J 8/008 422/218 |
| 5,372,792 A | * | 12/1994 | Mueller | B01J 8/008 422/218 |
| 5,389,235 A | | 2/1995 | Russ et al. | |
| 7,226,568 B1 | * | 6/2007 | Ham | B01D 53/0431 422/218 |
| 2004/0091404 A1 | * | 5/2004 | Ablin | B01J 8/003 422/211 |
| 2004/0134174 A1 | * | 7/2004 | Adhel-Hossein | B01D 53/0431 55/525 |
| 2006/0269461 A1 | * | 11/2006 | Scanlon | B01J 8/008 422/218 |
| 2012/0156111 A1 | | 6/2012 | Ramos et al. | |

* cited by examiner

COVER SYSTEM FOR A SOLID PARTICLE LINING AND REACTOR COMPRISING SUCH A SYSTEM

TECHNICAL FIELD OF THE INVENTION

The present invention relates to a reactor for performing chemical reactions in the gaseous phase at predetermined temperatures and pressures. More particularly, the invention relates to a "radial flow" reactor for reforming petroleum fractions, for example for producing gasoline of a high octane rating from naphthas.

TECHNICAL BACKGROUND OF THE INVENTION

It has already been proposed to use a cylindrical radial reactor in which the fluid is introduced by a peripheral scalloped portion into the body of a particulate packing which is based on a catalyst and is annular, said packing also being referred to as a "catalytic bed." This fluid passes radially through the packing and the effluent is collected in a perforated central pipe which passes vertically through the center of the packing and from which the effluent is then discharged.

The portion above the packing generally consists of a cap which covers the pipe, a sealed skirt made of refractory fabric and positioned on the packing for ensuring that the fluid passes through the peripheral scalloped portion, and a layer of inert beads positioned on the sealed skirt so as to keep said skirt pressed against the packing.

The design of this type of reactor requires the use of refractory fabrics generally made of short ceramic glass fibers which are carcinogenic. In addition, refractory fabrics are particularly delicate and can tear during production, which means that they have to be replaced after every cycle.

Furthermore, during production, these refractory fabrics may sometimes not be able to follow all the deformations of the packing resulting from the packing not being loaded in a compact enough manner prior to production.

SUMMARY OF THE INVENTION

The object of the invention is to overcome these drawbacks by providing a new covering system for a solid particle packing which is free of carcinogenic elements, can be reused over several cycles, can be adapted to several sizes of reactor and is capable of matching the deformations of the packing.

To this end, the invention relates to a covering system for a solid particle packing, characterized in that it comprises a hinged structure and an annular casing which covers the hinged structure, the casing being formed by metal plates sealingly mounted so as to be movable relative to one another, the hinged structure comprising metal skirts which form hinged concentric circles for supporting the plates of the casing and for adapting to the deformations of the packing, and metal elements which form hinged spacers for maintaining a spacing between the hinged concentric circles and for adapting to the deformations of the packing.

Advantageously according to the invention, the covering system for a solid particle packing uses metal parts which are free of carcinogenic elements. In addition, these metal parts are more durable than refractory fabrics, and this makes it possible to reuse them over several cycles. Finally, since these metal parts are hinged relative to one another, it is possible to select the number of parts such that they are adapted to different sizes of reactor but are also movable relative to one another so that they can rest permanently against the packing even if deformations have occurred during production.

According to other optional features for carrying out the invention:
- the hinged structure comprises between 3 and 6 hinged concentric circles;
- each hinged concentric circle comprises between 3 and 10 metal skirts that are movable relative to one another;
- the hinged structure comprises between 3 and 8 hinged spacers;
- each hinged spacer comprises between 2 and 5 metal elements which are movable relative to one another;
- the casing comprises between 7 and 27 metal plates;
- the metal plates form ring segments;
- the metal plates are sealingly mounted so as to be movable relative to one another by means of ceramic fiber cords;
- the hinged structure comprises a cross piece at each intersection between the hinged concentric circles and the spacers;
- each cross piece has four free ends each pivotally mounted to a metal skirt or a metal element.

In addition, the invention relates to a chemical reactor comprising a chamber provided with an internal peripheral scalloped portion, a central pipe and a compartment comprising a solid particle packing, characterized in that the chemical reactor comprises a covering system as described above mounted between the internal peripheral scalloped portion and a cover which covers the pipe.

According to other optional features for carrying out the invention:
- the covering system is sealingly mounted against the cover by sealing means;
- the covering system further comprises a partition mounted on a peripheral portion of the casing which faces the internal peripheral scalloped portion so as to form a gap between the partition and the internal peripheral scalloped portion which is arranged to receive inert beads.

BRIEF DESCRIPTION OF THE DRAWINGS

An embodiment of the invention will now be explained by way of non-limiting example and with reference to the appended drawings in which.

DETAILED DESCRIPTION OF AT LEAST ONE EMBODIMENT OF THE INVENTION

In the various figures, identical or similar elements are denoted by the same reference signs, possibly with a subscript character. The description of their structure and function is therefore not always repeated.

Figure 1:
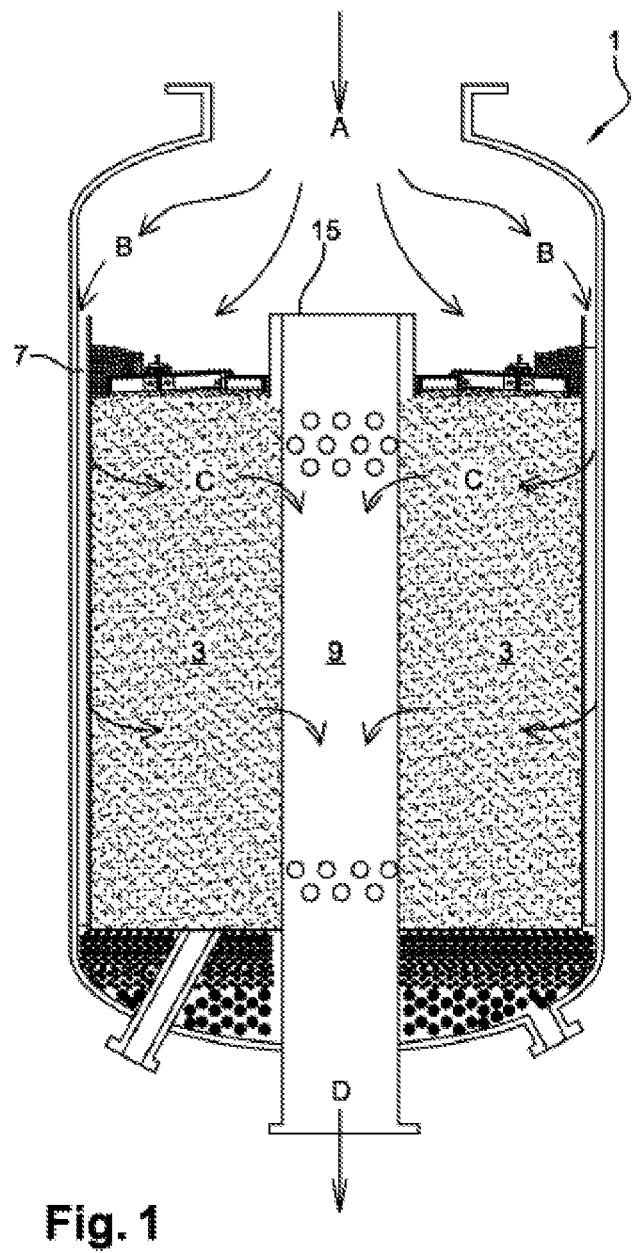
FIG. 1 is a cross-sectional view of a reactor according to the invention.

In the following, the orientations refer to the position of the reactor in FIG. 1. In particular, the terms "upper," "lower," "left," "right," "vertical" and "horizontal" generally refer to the position of the reactor in FIG. 1. Of course, the terms have to be adapted according to a change in the position of the reactor relative to the position in FIG. 1.

The chemical reactor 1 according to the invention is intended to provide for "horizontal baffling" so as to force the radial passage C of the fluid through a packing 3 formed of stacked solid, catalyst-based particles (granules, rods, grains, etc.) in order to subject the fluid to a chemical reaction capable of converting it.

More specifically, the fluid is introduced into the upper portion of the reactor 1 in the direction A. The reactor 1 comprises a covering system 5 for causing a deflection B of the fluid toward an internal peripheral scalloped portion 7 which will force the radial passage C of the fluid into the body of the packing 3, also referred to as the "catalytic bed." The fluid passing through the packing 3 is converted upon contact with the packing and the reaction products are collected in a perforated central pipe 9 which passes vertically through the center of the packing 3 and from which the reaction products are discharged in the direction D toward the lower portion of the reactor 1.

The invention relates to the particular covering system 5 described below. As shown in FIGS. 1 to 6, the covering system 5 for the solid particle packing 3 primarily comprises a hinged structure 11 and an annular casing 13 for sealingly covering the hinged structure 11. Advantageously according to the invention, the covering system 5, which is mounted between the internal peripheral scalloped portion 7 and a cover 15 which covers the pipe 9, will cause the deflection B of the fluid toward the internal peripheral scalloped portion 7 but will also be able to rest permanently against the packing 3 even if said packing deforms during production. More specifically, the packing 3 is in contact with the underside of the annular casing 13 such that the majority of the hinged structure 11 is embedded in the upper portion of the packing 3.

Figure 2:
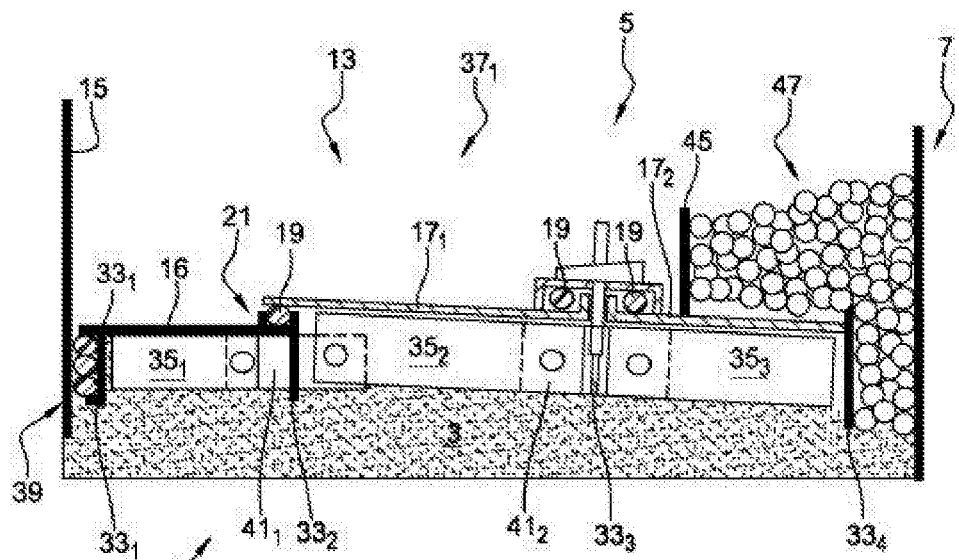
FIG. 2 is a partial and enlarged view of FIG. 1 centered on a covering system according to the invention.
Figure 3:
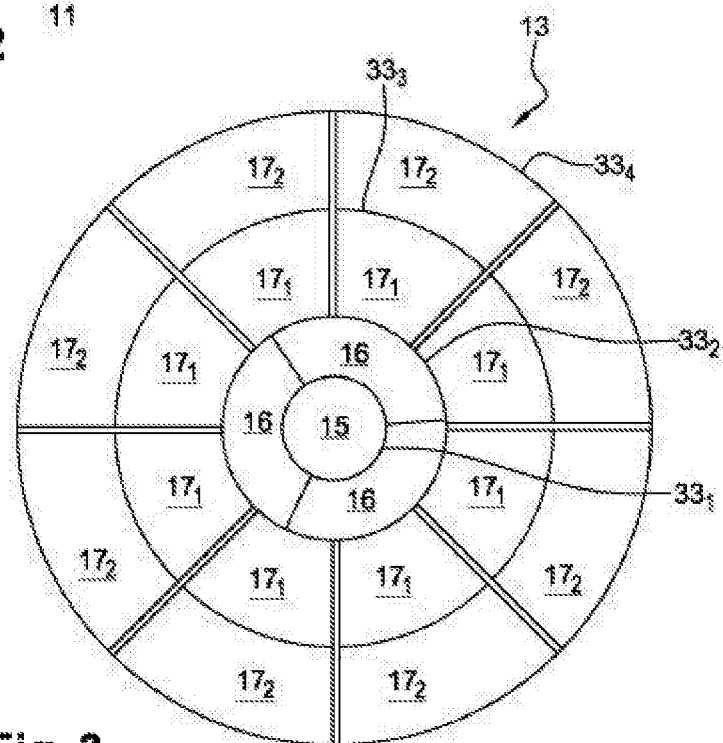
FIG. 3 is a plan view of a casing of the covering system according to the invention.

As can be seen in FIGS. 2 and 3, the annular casing 13 is formed by metal plates 16, 17 sealingly mounted so as to be movable relative to one another. More precisely, depending on the configuration of the reactor 1, the annular casing 13 may comprise between seven and twenty-seven metal plates which have a thickness of between one millimeter and five millimeters. Thus, advantageously according to the invention, it is possible to select the number of plates such that they are adapted to different sizes of reactor 1 typically having internal diameters of between 1.5 meters and 4 meters.

As best seen in FIG. 3, a first series of plates 16 forms a central ring around the cover 15. In the example from FIG. 3, the first series is formed of three plates 16 in the shape of a ring segment which have a width of approximately 25 cm. Of course, the width and/or the number of plates 16 of the first series may be less than or greater than these values, which are given only by way of example. Similarly, the shape of the plates 16 could be adapted to the scenario where the cover 15 does not have a circular peripheral surface but instead has, for example, a polygonal surface.

As seen in FIG. 3, a second series of plates 17 forms at least one peripheral ring around the central ring. In the example from FIG. 3, the second series is formed of eight first plates $17_1$ in the shape of a ring segment and surrounded by eight second plates $17_2$ in the shape of a ring segment, the widths of plates $17_1$ and $17_2$ being adapted to the diameter of the reactor 1. Of course, the number of plates $17_x$ and/or the number of peripheral rings of the second series may be less than or greater than these values, which are given only by way of example. Similarly, the plates $17_x$ could be of a different shape without losing their function as having, for example, completely or in part a substantially trapezoidal shape.

As explained above, the annular casing 13 has to be sealed to allow the deflection B of the fluid but also has to be adapted to the deformations of the packing 3. This is why the metal plates 16, $17_x$ are, preferably according to the invention, sealingly mounted so as to be movable relative to one another by means of, for example, at least one cord 19, preferably made of ceramic fiber.

In the example from FIG. 2, it can be seen that a peripheral groove 21 is formed in the first series of plates 16 so as to receive at least one cord 19, the second series of plates $17_1$ being mounted so as to sealingly abut said cord.

Figure 6:
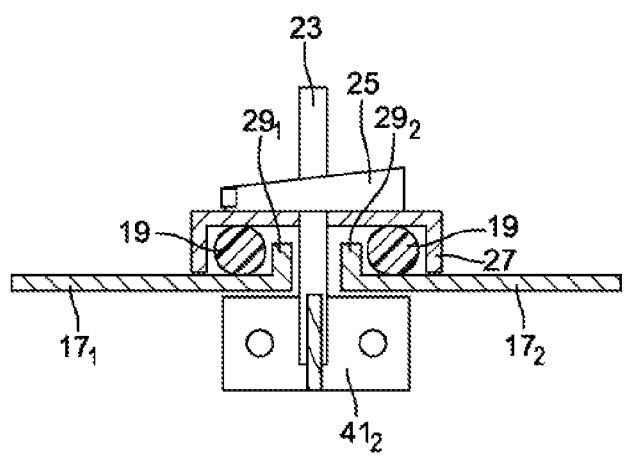
FIG. 6 is a partial and enlarged view of FIG. 2 showing the interaction between the casing and the hinged structure of the covering system according to the invention.

In addition, in the example from FIGS. 2 and 6, it can be seen that a peripheral rim $29_1$, $29_2$ is formed on the second series of plates $17_1$, $17_2$ to each receive at least one cord 19. Thus, the two adjacent plates $17_1$ and $17_2$ are rigidly secured by means of a U-shaped profile 27 pressed against the cords 19 by means of an assembly consisting of a shaft 23 and a conical flange 25. Furthermore, in FIG. 6, it can be seen that the shaft 23 is mounted on a cross piece $41_2$ of the hinged structure 11 as explained below. The second series of plates $17_x$ is therefore movable and sealed.

Of course, the nature and/or the geometry of the cord 19 and/or the number of cords may differ without losing the advantages of the invention. Similarly, the type of sealing could be the same between all the plates 16, $17_x$ of the casing 13 or even be different from the two types of sealing presented above without losing the advantages of the invention.

Advantageously according to the invention, the hinged structure 11 comprises metal skirts 31 forming hinged concentric circles $33_x$. The hinged concentric circles $33_x$ make it possible to support the plates 16, $17_x$ of the casing 13 and to adapt to the deformations of the packing 3.

The hinged structure 11 may comprise between three and six hinged concentric circles $33_x$, depending on the width of the reactor 1. In addition, each hinged concentric circle $33_x$ may comprise between three and ten metal skirts $31_x$ which have a height of between five and ten centimeters, and which are movable relative to one another as explained below. Indeed, it is immediate that the more skirts $31_x$ a concentric circle $33_x$ has, the more precise its adaptation to the deformations of the packing 3.

In addition, in the example from FIG. 2, the skirts $31_x$ of the hinged concentric circle $33_1$ comprise sealing means 39 for preventing the fluid from passing between the cover 15 and the hinged concentric circle $33_1$. These sealing means 39 may be of the same type as the cords 19 and comprise for example three cords pressed against the cover 15 by means of, for example, a simple gland (not shown) so as to allow the hinged concentric circle $33_1$ to slide along the cover 15 in the case of deformations of the packing 3.

The hinged structure 11 further comprises metal elements $35_x$ forming hinged spacers $37_x$ for maintaining a substantially constant spacing between the hinged concentric circles $33_x$ and for adapting to the deformations of the packing 3. Thus, the hinged structure 11 may comprise between three and eight hinged spacers $37_x$ which extend radially between the cover 15 and the peripheral portion of the casing 13. In addition, each hinged spacer $37_x$ may comprise between two and five metal elements which are movable relative to one another.

In the example from FIGS. 2 and 3, the hinged concentric circles $33_1$ to $33_4$ are thus kept at a predetermined distance from one another by means of three hinged spacers $37_x$, each formed by three elements $35_1$ to $35_3$.

Figure 4:
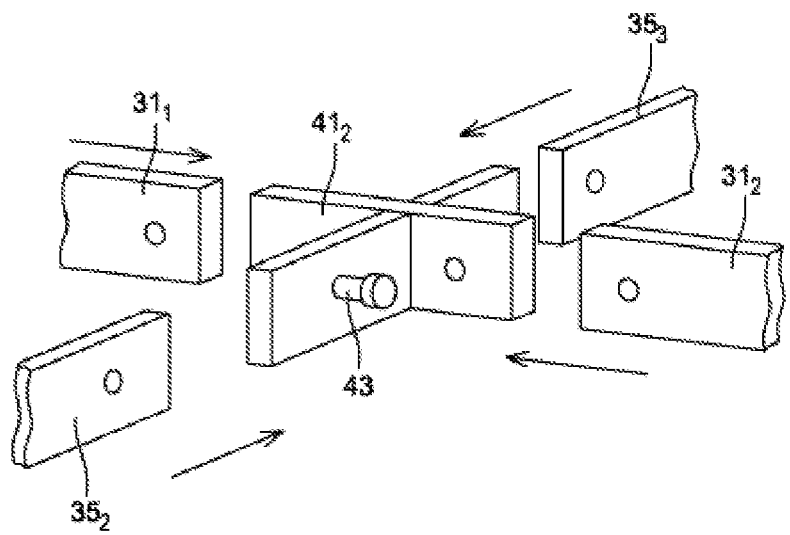
FIG. 4 is a perspective view, before assembly, of a hinged structural part of the covering system according to the invention.
Figure 5:
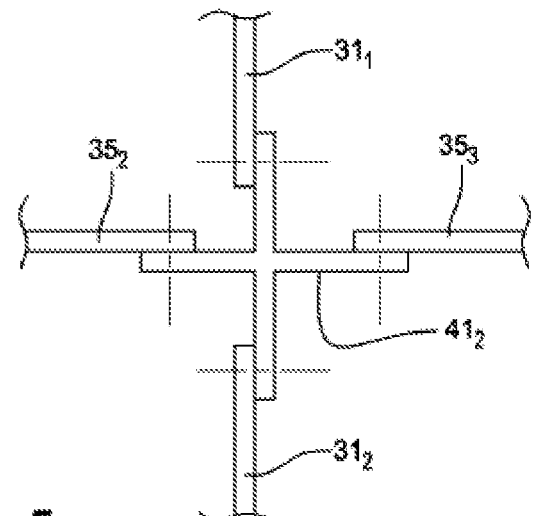
FIG. 5 is a plan view, after assembly, of a hinged structural part of the covering system according to the invention.

Finally, as illustrated in FIGS. 4 and 5, preferably according to the invention, the hinged structure 11 further comprises a cross piece $41_x$ at each intersection between the hinged concentric circles $33_x$ and the spacers $37_x$. Thus, each cross piece $41_x$ may have four free ends each pivotally mounted to a metal skirt $31_x$ or a metal element $35_x$ by means of a pivot pin 43.

Advantageously according to the invention, the covering system 5 for the solid particle packing 3 therefore uses metal parts for the hinge 11 and the casing 13, such as a refractory stainless steel of the TP321 type, which does not pose a carcinogenic risk for the operators of the reactor 1.

In addition, these metal parts are more durable than refractory fabrics, and this makes it possible to reuse them over several cycles. Finally, since these metal parts are hinged relative to one another, it is possible to select the number of parts such that they are adapted to different sizes of reactor 1 but are also movable relative to one another so that they can rest permanently against the packing 3 even if deformations have occurred during production.

Finally, since the packing 3 completely fills the spaces delimited between the hinged concentric circles 33 and the elements 35 of the hinged structure 11, even while passing under the plates 16, $17_x$ of the casing 13, the fluid to be converted will be converted upon contact with the packing 3 during the radial passage C.

The invention is not limited to the embodiments presented here and other embodiments will become clearly apparent to a person skilled in the art. It is in particular possible for the covering system 5 to further comprise a partition 45 (which can be seen in FIG. 2) mounted on a peripheral portion of the casing 13 which faces the internal peripheral scalloped portion 7 so as to form a gap between the partition 45 and the internal peripheral scalloped portion 7 which is arranged to receive inert beads 47, based for example on aluminum. This design variant makes it possible to limit the number of different plates $17_x$ and to avoid having to develop a shape corresponding to the peripheral scalloped portion 7 for the peripheral plates $17_x$.

The invention claimed is:

1. A covering system for a solid particle packing, comprising a hinged structure and an annular casing which covers the hinged structure, the annular casing being formed by metal plates sealingly mounted so as to be movable relative to one another, the hinged structure comprising metal skirts which form hinged concentric circles for supporting the plates of the casing and for adapting to the deformations of the packing, and metal elements which form hinged spacers for maintaining a spacing between the hinged concentric circles and for adapting to the deformations of the packing.

2. The system of claim 1, wherein the hinged structure comprises between 3 and 6 hinged concentric circles.

3. The system of claim 1, wherein each hinged concentric circle comprises between 3 and 10 metal skirts that are movable relative to one another.

4. The system of claim 1, wherein the hinged structure comprises between 3 and 8 hinged spacers.

5. The system of claim 1, wherein each hinged spacer comprises between 2 and 5 metal elements which are movable relative to one another.

6. The system (of claim 1, wherein the casing comprises between 7 and 27 metal plates.

7. The system of claim 1, wherein the metal plates form ring segments.

8. The system of claim 1, wherein the metal plates are sealingly mounted so as to be movable relative to one another by means of ceramic fiber cords.

9. The system of claim 1, wherein the hinged structure comprises a cross piece at each intersection between the hinged concentric circles and the spacers.

10. The system of claim 9, wherein each cross piece has four free ends, with each end pivotally mounted to one of said metal skirts or one of said metal elements.

11. A chemical reactor comprising a chamber provided with an internal peripheral scalloped portion, a central pipe, a compartment comprising a solid particle packing, and a covering system according to claim 1 mounted between the internal peripheral scalloped portion and a cover which covers the pipe.

12. The chemical reactor of claim 11, wherein the covering system is sealingly mounted against the cover by sealing means.

13. The chemical reactor of claim 11, wherein the covering system further comprises a partition mounted on a peripheral portion of the casing which faces the internal peripheral scalloped portion so as to form a gap between the partition and the internal peripheral scalloped portion which is arranged to receive inert beads.

* * * * *